C. JOHNSON.
TORCH.
APPLICATION FILED MAR. 24, 1910.
969,875. Patented Sept. 13, 1910.
2 SHEETS—SHEET 2.
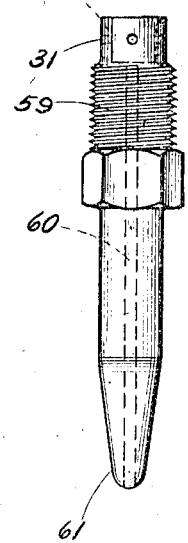
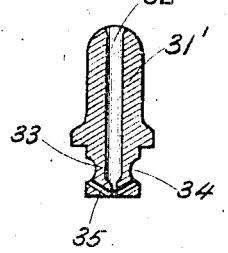
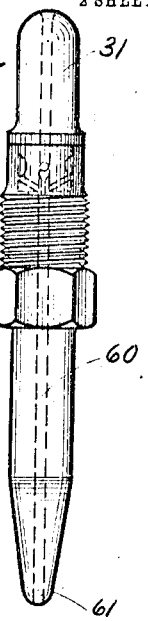
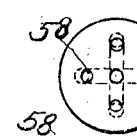
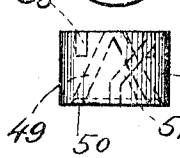
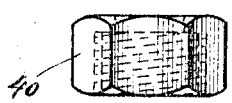
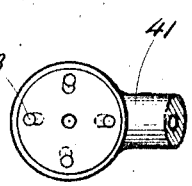
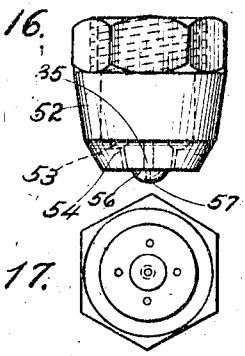
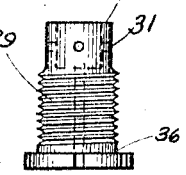
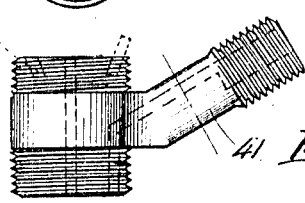
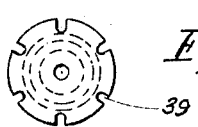
Witnesses:
Inventor:
Carl Johnson
By Sheridan, Wilkinson, Scott & Richmond Att'ys

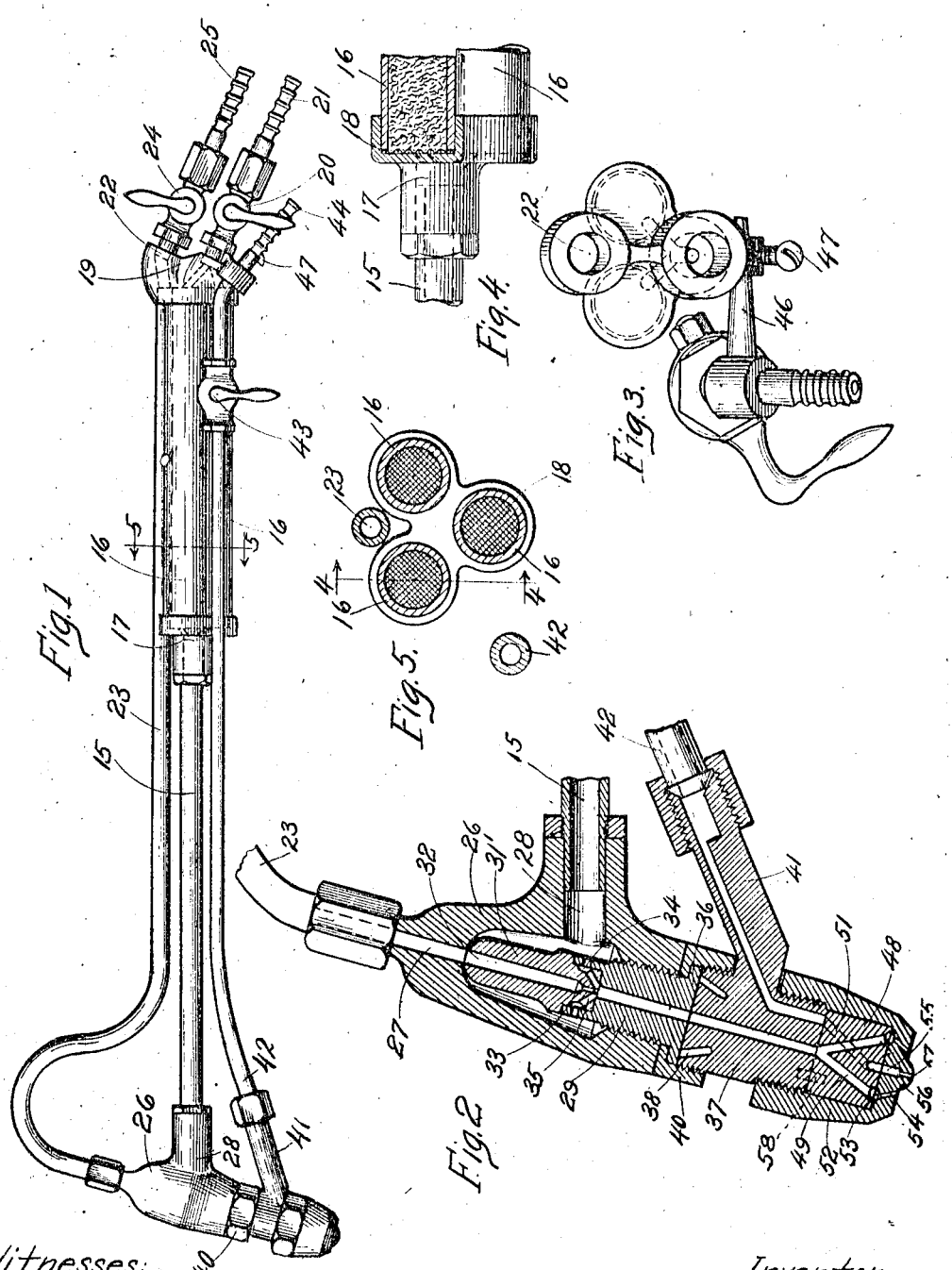

UNITED STATES PATENT OFFICE.

CARL JOHNSON, OF CHICAGO, ILLINOIS.

TORCH.

969,875.  Specification of Letters Patent.  Patented Sept. 13, 1910.

Application filed March 24, 1910. Serial No. 551,334.

*To all whom it may concern:*

Be it known that I, CARL JOHNSON, a citizen of the United States, residing at Chicago, in the county of Cook and State of Illinois, have invented certain new and useful Improvements in Torches, of which the following is a specification.

The principal object of my invention is to provide a new and improved torch for welding, brazing, cutting metal, or other like uses.

Another object of my invention is to provide such a torch having an improved mechanical structure so that it shall combine the fuel and the supply of oxygen in an advantageous manner.

Another object of my invention is to provide such a torch that can easily be taken apart and that shall not be likely to get out of order.

Another object is to make such a torch that shall be simple and inexpensive to build, and easy to operate by comparatively unskilled persons.

Another object is to make a torch that can readily be changed, so as to give either a welding flame or a cutting flame as may be desired.

All these objects and others will be more fully disclosed to those skilled in the art by reading the following specification and claims, taken in connection with the accompanying drawings.

For the purpose of illustrating and explaining my invention, I have shown one specific embodiment thereof in the accompanying drawings, but I have defined the invention in the claims which are appended at the end of this specification.

Referring to the drawings—Figure 1 is a side elevation. Fig. 2 is a vertical section through the axis of the head of the torch. Fig. 3 is a rear elevation of the header to which the rear ends of the tubes are attached. Fig. 4 is a vertical section on the line 4, 4 of Fig. 5, showing the asbestos filling in one of the tubes. Fig. 5 is a cross section on the line 5, 5 of Fig. 1. Fig. 6 is an elevation of the welding tip. Fig. 7 is an elevation of the same with the plug in place. Fig. 8 is a sectional view of the plug. Fig. 9 is a plan view of a detail or attachment by which the parts are suitably connected to the tubes, a portion being broken away. Fig. 10 is a side elevation of the same. Fig. 11 is an elevation of a connecting plug. Fig. 12 is an end view of the same. Fig. 13 is a detail view of a part by which the gas passages are connected. Fig. 14 is a side elevation of the same. Fig. 15 is a coupling nut. Fig. 16 is a side elevation of a screw tip. Fig. 17 is an end view of the same.

The particular embodiment of my invention which is shown in the drawings is a torch adapted to be supplied with acetylene and oxygen through suitable flexible tubing, thus permitting the torch to be manipulated. The acetylene gas pipe 15 is brazed at its inlet end into the header 17 which has sockets to receive the forward ends of three parallel tubes 16. The ends of these tubes 16 are closed with double thicknesses of brass gauze 18, which is for the purpose of retaining asbestos within the tubes 16. This asbestos is saturated with acetone in order to purify the acetylene gas. The rear ends of the three tubes 16 are soldered into the header 19, which connects all three of the tubes 16 to the inlet valve 20.

21 is a nipple adapted to receive the end of a flexible tube fitted over it.

The header 19 also has an independent socket 22, to which the inlet valve 24 connects, 25 being a nipple connected thereto and adapted to receive the end of a flexible tube. The socket 22 connects to the pipe 23, this being intended to convey oxygen under moderate pressure, say, about fifteen to forty pounds to the square inch.

At the forward ends of the pipes 15 and 23 is a mixing chamber 26, the acetylene pipe 15 leading into the same through the opening 28 and the oxygen pipe leading in through the opening 27. The lower open end of this mixing chamber 26 is closed by the screw plug 29, which has a cylindrical flange 30 around its inner end with radial perforations 31 therethrough. The plug 31' has an axial hole 32 registering with the hole 27, and the end 33 of this block 31' fits within the flange 30 on the plug 29. An annular groove 34 extends around the part 33 of the plug 31' this annular groove 34 being adjacent to the radial holes 31. From the annular groove 34 oblique holes 35 converge to the center as shown in the drawings. It will be seen that the course of the acetylene through the passages 28, 31, 34 and 35 brings it to mingle with the oxygen coming down through the passages 27 and 32.

The screw plug 29 has a flange 36 at its lower end, and the attachment 37 lies adjacent to this. The attachment 37 has a plurality of holes 38 drilled into it around the upper edge, and the flange 36 has notches 39 adapted to register with these holes in various angular positions. Thus, when the plug 29 has been screwed into the chamber 26 far enough to give it the desired degree of tightness, and then the angular position of the plug 29 can be marked relatively to the proper position of the attachment 37, as by a pencil mark on the two members. Next the plug 29 may be unscrewed sufficiently to drop pins in the registering holes 38 and notches 39, and then the plug 29 screwed back to its normal position, the attachment 37 being rotated therewith. The nut 40 engages the threaded exterior of the attachment 37 and the flange 36 and binds the parts snugly together.

The attachment 37 has a branch 41 with a conduit therethrough for high pressure oxygen, say at a pressure of one hundred and fifty to two hundred pounds per square inch. The oxygen pipe 42, connecting to this branch 41, has a controlling valve 43 and a nipple 44 to receive the end of the supply tube. At its rear end the pipe 42 carries a lateral projection 46 which slips into a hole in the header 19 and may be clamped there by means of the set screw 47.

A cylindrical block 48 lies adjacent to the lower end of the attachment 37 and has a plurality of conduits 49 diverging from the center; these receive the mixture of acetylene and oxygen coming down from the mixing chamber 26. The lower ends of these diverging conduits 49 open into a channel 50 on the lower face of the block 41. The high pressure oxygen conduit, through the extension 41, opens on the lower face of the attachment 37 and from this point an oblique conduit 51 leads to the center of the lower face of the block 48. The screw tip 52 is provided, which engages the attachment 37 and holds the cylindrical block 48 in place. A proper registry of the attachment 37 and block 48 is obtained by putting short pins in registering sockets 58. The tip 52 has an annular channel 53 that registers with the channel 50 to make an annular chamber, and from this a plurality of conduits 54 converge to their outlets on the face of the tip 52. The tip 52 also has a central conduit 55, which ends in a fine aperture 57 in a bead 56 on the face of the tip.

When it is desired to detach the high pressure oxygen pipe 42, this can readily be done by loosening the set screw 47 and the union or coupling nut 40.

It will readily be understood that the low pressure oxygen in the pipe 23 and the acetylene mingle in the mixing chamber 26 and the mixture passes down through the central axial conduit in the head of the torch, branching into the conduits 49 to the annular chamber 50—53, and then converging through the outlet openings 54. In addition, a supply of high pressure oxygen discharges centrally from the tip through the orifice 57, thus making a powerful cutting flame that may be used to cut metal. When it is desired to have a welding flame, the tip that has been described may be removed, together with the pipe 42, and the tip 59 may be screwed into the mixing chamber 26. In this case the same block 31' is used, being engaged by the flange 30. The welding tip has a single axial conduit 60 for the mixed acetylene and oxygen which discharge from the extremity 61.

The acetylene purifier comprises the three chambers 16 and serves as a handle by which to hold the torch.

The particular arrangement of conduits and mixing chamber which I have shown and described has been found to be highly efficient in practice and gives superior results. The arrangement of the parts is such that they may be easily assembled or taken apart, and the device is simple and inexpensive to build and maintain in order. When it is desired to change the torch so as to change from a cutting flame to a welding flame or vice versa, this can conveniently be done.

I claim:

1. In a device of the class described, an acetylene gas pipe, an enlarged chamber interposed in said pipe, and asbestos saturated with acetone in said chamber.

2. In a device of the class described, a fuel gas pipe, a hollow header connected thereto, multiple tubular chambers connected to the header, and means in said chamber for purifying the gas.

3. In a device of the class described, an acetylene gas pipe, a header connected thereto, a plurality of closely arranged tubular chambers connected to said header, asbestos saturated with acetone in said tubular chambers, and a valved inlet supply pipe connected by means of a header to the opposite end of the chambers.

4. In a device of the class described, fuel gas and oxygen pipes lying side by side, a header connected to both said pipes, said header having a slot therein, a supplementary oxygen pipe having a laterally projecting arm adapted to enter said slot, and a set screw to engage said arm in the slot.

5. In a device of the class described, a head having a chamber therein, a plug adapted to be screwed into said head, a flange on the plug within the head, said flange having radial perforations therethrough, and an inner block adapted to fit within said flange and having an axial duct therein.

6. In a device of the class described, a head having a mixing chamber therein, a plug adapted to be screwed into said chamber, a flange on the inner end of said plug with radial holes therethrough, a block fitting into the flange and having an annular chamber opposite the radial perforations in the flange, said block having converging ducts leading to the center from said annular chamber, and said block also having an axial duct meeting said converging ducts.

7. In a device of the class described, a head having a mixing chamber therein, a plug adapted to be screwed into said chamber, an attachment to be fastened to the plug, the meeting faces having depressions adapted to register at different angular positions, and locking means to engage such depressions.

8. In a device of the class described, a head having a mixing chamber therein, a plug adapted to be screwed into said chamber, an attachment to be fastened to the plug, the meeting faces of the plug and said attachment having means for fixing them together at any desired angular adjustment, and a nut adapted to engage the plug and attachment and draw them tightly together.

9. In a device of the class described, a head having a mixing chamber therein, a plug adapted to be screwed into said chamber, an attachment to be fastened to the plug, the meeting faces of the plug and said attachment having means for fixing them together at any desired angular adjustment, said attachment having a high pressure oxygen pipe leading thereto, and separate conduits therethrough for mixed oxygen and acetylene in one conduit and high pressure oxygen in the other conduit.

10. In a device of the class described, a torch head having a central conduit therethrough for mixed oxygen and acetylene and an eccentric conduit for high pressure oxygen, branching conduits from the central conduit opening at the end of the torch head, and a central aperture at the end of the torch head connected to the said eccentric conduit.

11. In a device of the class described, a torch head comprising a cylindrical block and a screw cap fitting over the same, said block and cap having meeting annular channels to form an annular chamber, a duct through the said block to convey mixed oxygen and acetylene to the annular chamber, converging ducts from said annular chamber to the end of the cap to discharge such mixture, and a central duct through the end of the cap registering with a duct in the block to discharge high pressure oxygen from the end of the cap.

In testimony whereof, I have subscribed my name.

CARL JOHNSON.

Witnesses:
  HENRY A. PARKS,
  ANNA L. WALTON.